United States Patent
Deighton et al.

(10) Patent No.: US 8,651,438 B2
(45) Date of Patent: Feb. 18, 2014

(54) COLLAPSIBLE LIGHT

(75) Inventors: Kevin Deighton, Long Beach, CA (US); Darren Judd, Stamford (GB)

(73) Assignee: Pelican Prodcuts, Inc., Torrance, CA (US)

( * ) Notice: Subject to any disclaimer, the term of this patent is extended or adjusted under 35 U.S.C. 154(b) by 0 days.

(21) Appl. No.: 13/474,608

(22) Filed: May 17, 2012

(65) Prior Publication Data
US 2012/0261530 A1 Oct. 18, 2012

Related U.S. Application Data

(62) Division of application No. 12/591,487, filed on Nov. 20, 2009, now Pat. No. 8,201,979.

(51) Int. Cl.
*F16M 11/00* (2006.01)

(52) U.S. Cl.
USPC .................. 248/163.1; 248/178.1; 248/171; 362/413

(58) Field of Classification Search
USPC ......... 248/163.1, 177.1, 178.1, 171; 362/285, 362/191
See application file for complete search history.

(56) References Cited

U.S. PATENT DOCUMENTS

| 3,064,932 | A | * | 11/1962 | Holderman | 248/171 |
| 3,697,031 | A | | 10/1972 | Glickman et al. | |
| 4,974,134 | A | * | 11/1990 | Bourne | 362/286 |
| 5,060,894 | A | * | 10/1991 | Hillinger | 248/170 |
| 5,068,773 | A | * | 11/1991 | Toth | 362/386 |
| 5,075,834 | A | * | 12/1991 | Puglisi | 362/386 |
| D335,889 | S | * | 5/1993 | Gibran | D16/244 |
| 5,345,305 | A | * | 9/1994 | Chen | 356/221 |
| 5,513,085 | A | * | 4/1996 | Bourne | 362/286 |
| 5,684,452 | A | * | 11/1997 | Wang | 340/321 |
| 5,934,628 | A | | 8/1999 | Bosnakovic | |
| 5,964,524 | A | * | 10/1999 | Qian | 362/414 |
| 6,265,969 | B1 | * | 7/2001 | Shih | 340/468 |

(Continued)

FOREIGN PATENT DOCUMENTS

| BE | 458242 | 3/1945 |
| DE | 295 20 042 | 2/1996 |
| WO | WO-2009/108455 | 9/2009 |

OTHER PUBLICATIONS

Chinese First Office Action for Application No. 201010551699.2, issued by SIPO on Jul. 9, 2012, 9 pages.

(Continued)

*Primary Examiner* — Terrell McKinnon
*Assistant Examiner* — Daniel J Breslin
(74) *Attorney, Agent, or Firm* — Foley & Lardner LLP

(57) ABSTRACT

A collapsible device has a main body surrounded by a collar whose position is adjustable along the longitudinal axis of the main body. Pivotally connected or hinged legs are attached to the collar and to the main body with struts. When the collar is on one position, the legs deploy outward from the main body to the extent permitted by the struts, thereby allowing the legs to support the collapsible device upright. An operational unit is attached to a member that telescopes from the main body. When the collar is another position, the legs are drawn in toward the main body to form a cylindrical shape for facilitating transportation. The operational unit can be positioned so that when the telescoping member is retracted into the main body, the collar surrounds the exterior of the operational unit, thus protecting the operational unit for transport.

25 Claims, 12 Drawing Sheets

(56) References Cited

U.S. PATENT DOCUMENTS

| | | | |
|---|---|---|---|
| 6,371,625 B2 * | 4/2002 | Campman | 362/184 |
| 6,438,889 B1 * | 8/2002 | Handy | 43/21.2 |
| 6,454,228 B1 * | 9/2002 | Bosnakovic | 248/177.1 |
| 6,854,861 B2 * | 2/2005 | Chao | 362/197 |
| 6,873,249 B2 * | 3/2005 | Chu | 340/332 |
| D505,442 S * | 5/2005 | Murray et al. | D16/244 |
| 6,899,441 B2 * | 5/2005 | Chen | 362/102 |
| D508,938 S * | 8/2005 | Murray et al. | D16/244 |
| D514,009 S * | 1/2006 | Parr et al. | D10/113.2 |
| 7,011,280 B2 * | 3/2006 | Murray et al. | 248/171 |
| 7,011,423 B2 * | 3/2006 | Chen | 362/102 |
| 7,063,444 B2 * | 6/2006 | Lee et al. | 362/285 |
| 7,195,377 B2 * | 3/2007 | Tsai | 362/431 |
| 7,224,271 B2 * | 5/2007 | Wang | 340/473 |
| D562,715 S * | 2/2008 | Treloar | D10/113.4 |
| 7,364,320 B2 * | 4/2008 | Van Deursen et al. | 362/190 |
| 7,484,858 B2 * | 2/2009 | Deighton et al. | 362/109 |
| D639,986 S * | 6/2011 | Wessel | D26/46 |
| 8,087,797 B2 * | 1/2012 | Pelletier et al. | 362/205 |
| 8,142,045 B2 * | 3/2012 | Peak | 362/191 |
| 8,201,979 B2 * | 6/2012 | Deighton et al. | 362/413 |
| 8,262,248 B2 * | 9/2012 | Wessel | 362/198 |
| 2003/0103357 A1 | 6/2003 | Drake et al. | |
| 2004/0011930 A1 * | 1/2004 | Tuohy et al. | 248/146 |
| 2005/0117340 A1 | 6/2005 | Lee et al. | |
| 2006/0209547 A1 | 9/2006 | Biondo et al. | |
| 2007/0019398 A1 * | 1/2007 | Chen et al. | 362/102 |
| 2009/0103290 A1 * | 4/2009 | Liu | 362/197 |
| 2010/0053944 A1 * | 3/2010 | Yao-Lin | 362/198 |
| 2011/0122605 A1 * | 5/2011 | Deighton et al. | 362/183 |
| 2012/0261530 A1 * | 10/2012 | Deighton et al. | 248/157 |

OTHER PUBLICATIONS

English translation of First Office Action in corresponding Chinese Application No. 201010551699.2, issued Jul. 9, 2012 by SIPO.
European Search Report for related EP Application EP10075729, dated Feb. 16, 2011, 3 pages.

* cited by examiner

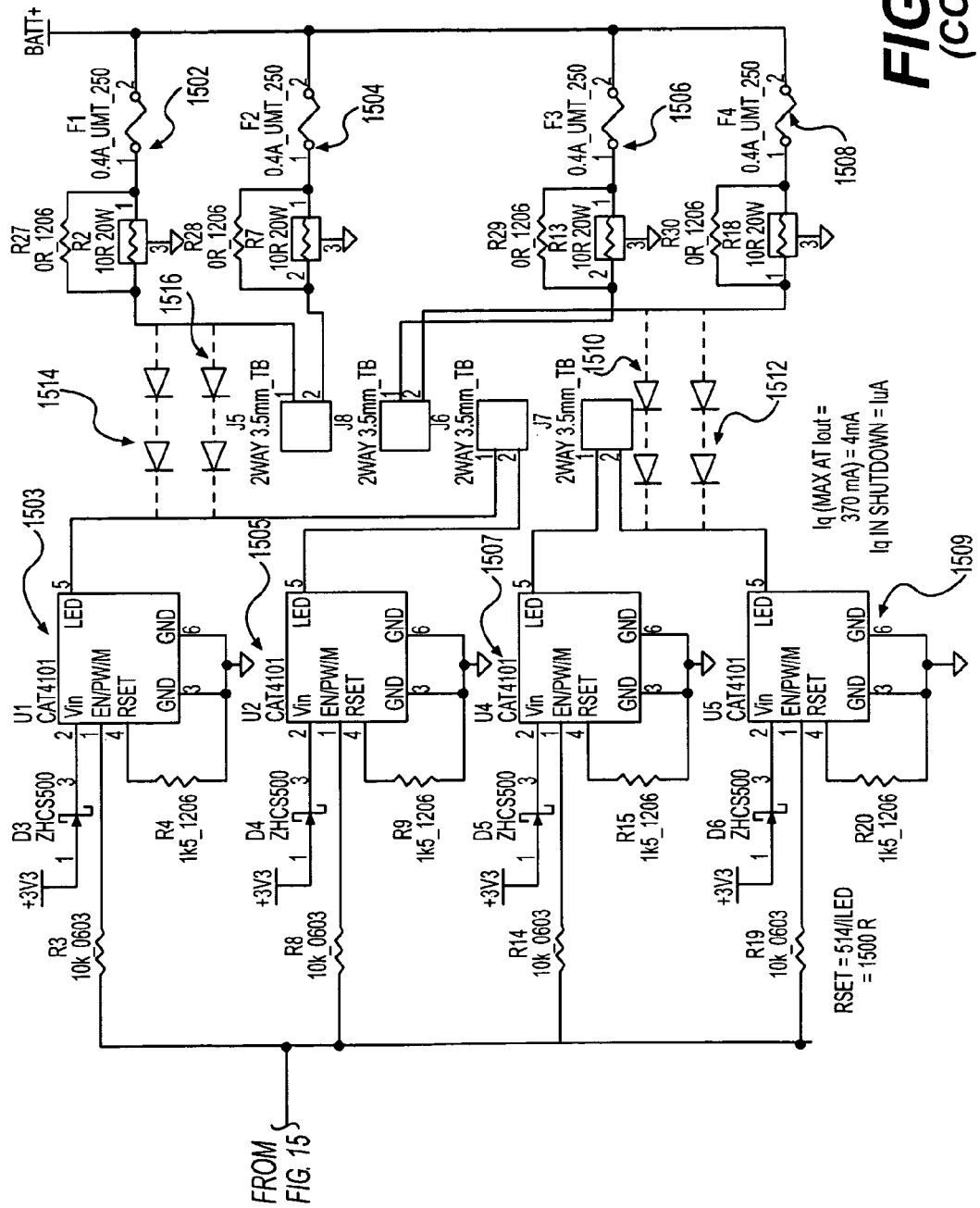
FIG. 15 (CONT')

COLLAPSIBLE LIGHT

CROSS-REFERENCE TO RELATED PATENT APPLICATIONS

This application is a Divisional of U.S. application Ser. No. 12/591,487, filed Nov. 20, 2009, now U.S. Pat. No. 8,201,979 incorporated herein by reference in its entirety.

BACKGROUND OF THE INVENTION

1. Field of the Invention

The Invention relates to collapsible structures, in particular a collapsible structure having an operational unit that can be transported.

2. Background of the Invention

Flashlights have been used extensively in areas where lighting is not available. In many circumstances, however, flashlights are inadequate because they fail to provide adequate lighting to accommodate the needs of workers, campers, or persons engaged in other activities. Portable lights which stand alone provide necessary levels of light while leaving workers and other individuals free hands to perform tasks and conduct other activities. Portable lights, however, tend to be bulky and large and inconvenient to carry. The invention disclosed herein provides a collapsible light in a form factor which is portable and easy to carry to provide light for many applications.

DETAILED DESCRIPTION OF THE PREFERRED EMBODIMENTS

Figure 1:
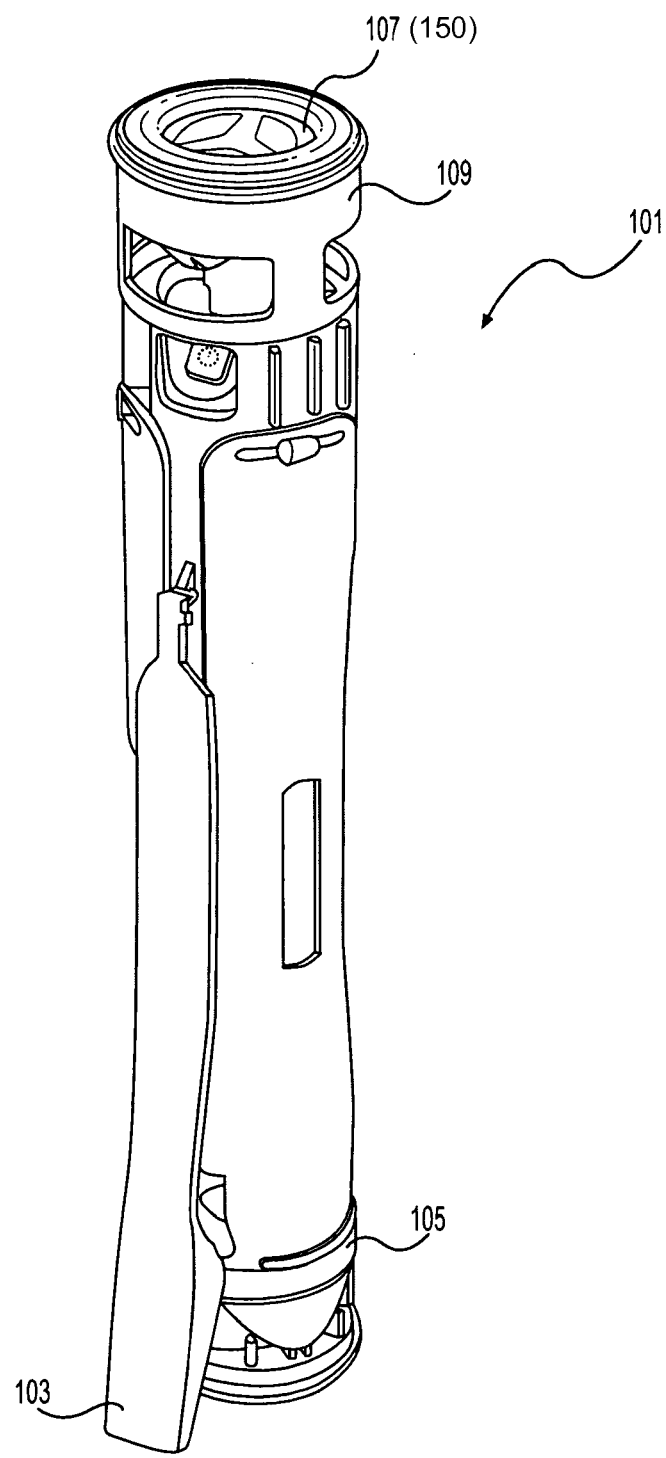
FIG. 1 shows a collapsible structure according to the invention in a collapsed position for transport.
Figure 2:
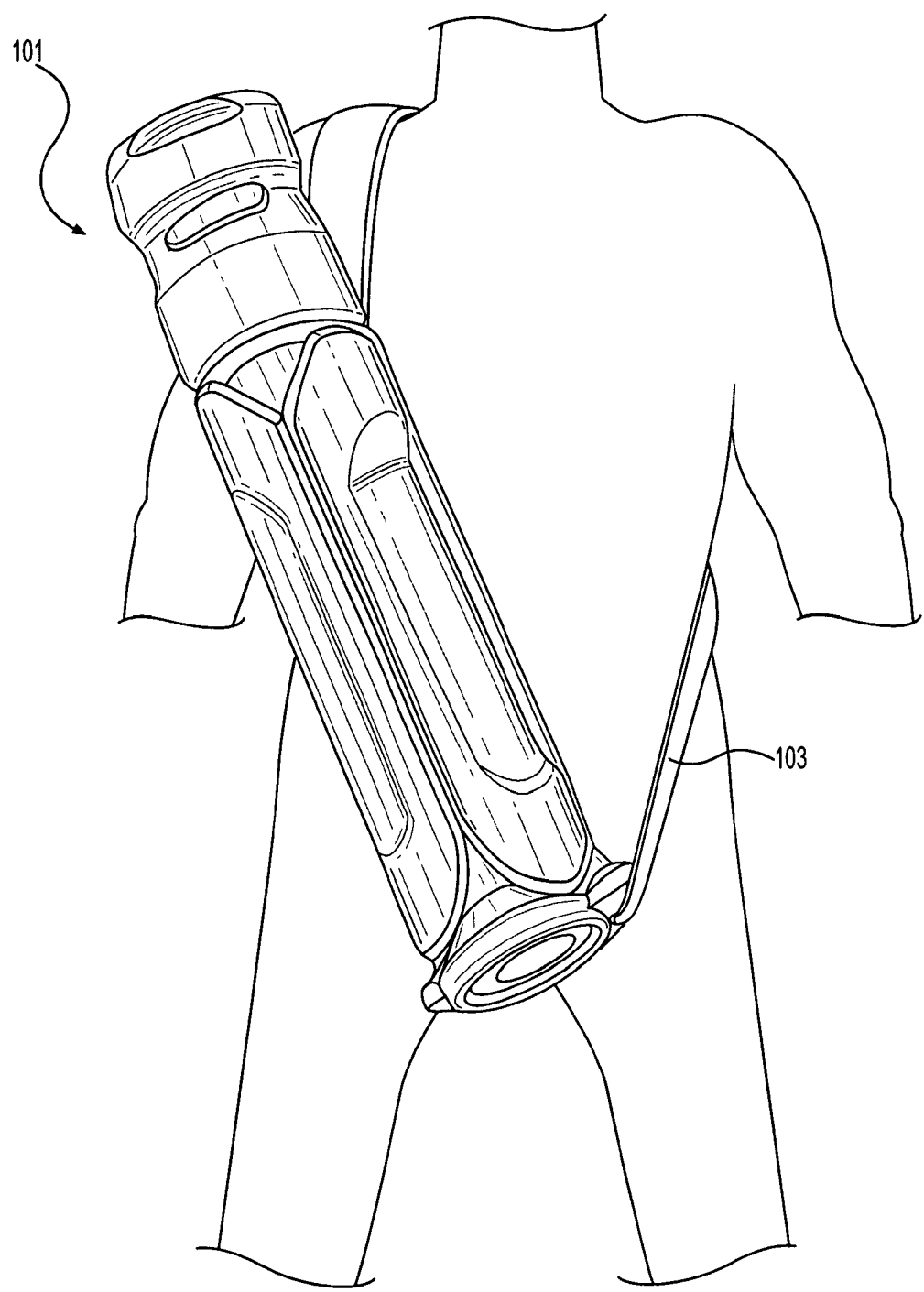
FIG. 2 illustrates a collapsible structure in a collapsed position as it might be carried on a back of a person.

FIG. 1 shows a collapsible structure 101, such as a collapsible light, according to the invention in a substantially cylindrical form factor, resembling a bazooka, for easy transport. Collapsible structure 101 has attached to it a carrying strap, 103, to facilitate carrying the bazooka-shaped collapsible structure 101 on one's back, as illustrated in FIG. 2. FIG. 1 further shows securing strap 105. Securing strap 105 can be used as one way to secure the legs, as discussed further herein, to form an exterior portion of the cylindrical shape in the collapsed position. Other means for securing the legs in the collapsed position can also be used. FIG. 1 further illustrates operational unit 150, such as lamp head 107, which has sockets therein for illuminating elements. As shown in FIG. 1, lamp head 107 is tucked into a collar 109 to protect the lamp head 107 when the collapsible structure 101 is in the collapsed position.

Figure 3:
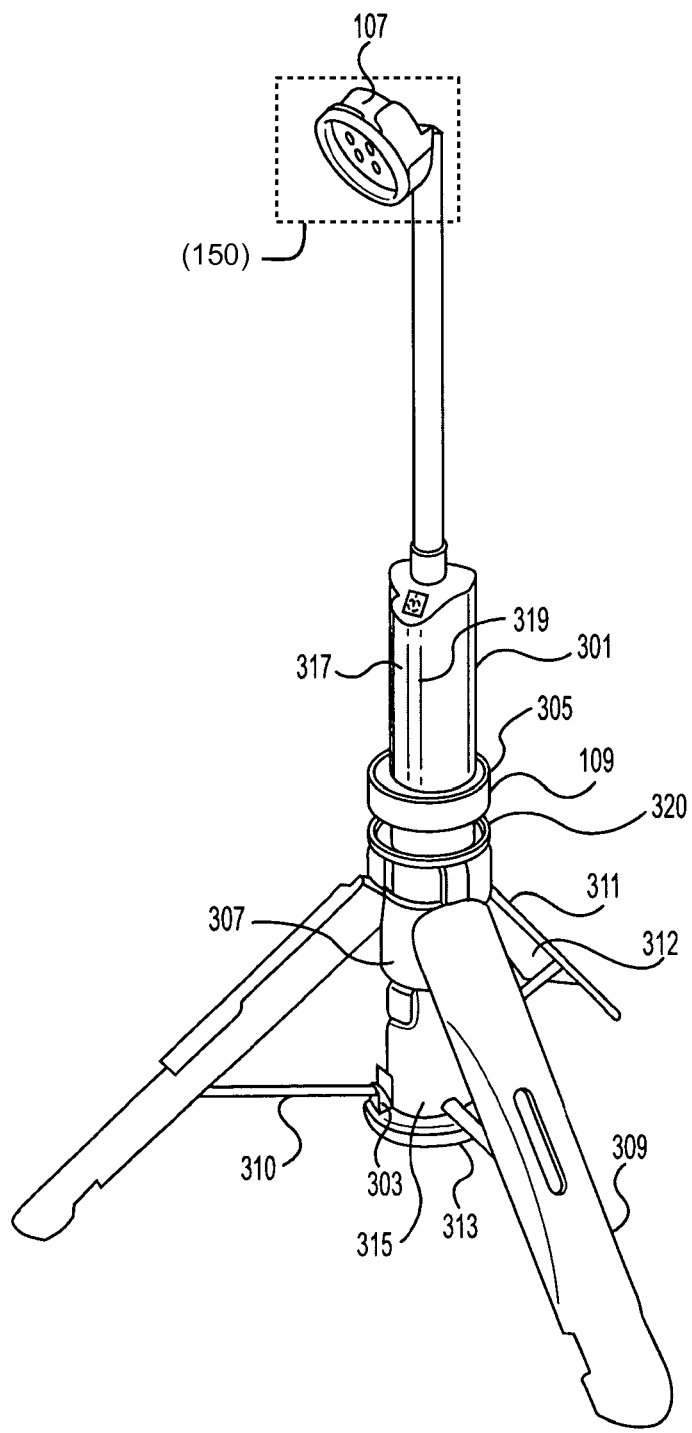
FIG. 3 shows a collapsible structure according to the invention in a fully deployed position.

FIG. 3 illustrates an embodiment of the collapsible structure 101 according to the invention in the deployed position. As shown in FIG. 3, the structure of the collapsible structure 101 according to the invention includes a main body 301 which mounts on top of a lower body serving as a battery compartment 303 to form a substantially cylindrical shape. The main body 301 and battery compartment 303 can be formed separately or as an integrated unit. Other shapes, such as triangular, square, oval and rectangular, may also be employed without departing from the scope of the invention.

The invention also is not limited to any particular battery type. For example, the battery can be rechargeable or non-rechargeable. Battery charging circuitry and a suitable plug to an external power source may be incorporated into the lower body battery compartment 303, or elsewhere in the collapsible structure 101, as may be convenient. It is within the scope of the invention to provide illumination using an AC power source and/or one or more transformers.

The interior of main body 301 can house electrical cables, such as a coiled electrical cable (not shown), to deliver electrical power to one or more illuminating elements, such as light emitting diodes, in the lamp head 107. Other types of illuminating elements, such as incandescent, halogen or fluorescent light elements, may be used in lamp head 107, without departing from the scope and spirit of the invention. As discussed further herein, the main body 301 also accommodates one or more telescoping members 608, which allow the operational unit 150 of the collapsible structure 101 according to the invention to be set at different heights to provide light over different size areas.

The main body 301 is surrounded by collar 109. In the exemplary configuration shown in FIG. 3, collar 109 is a two part hollow cylindrical member, including upper collar portion 305 and lower collar portion 307. The upper and lower collar portions, 305 and 307, may be formed separately and connected together or may be formed as an integrated unit. Upper collar portion 305 has a wider outer diameter than lower collar portion 307.

One or more legs 309 are pivotally attached or hinged to lower collar portion 307 at pivot points 311. The legs 309 preferably have a curved shape, such that when the portable light according to the invention is in the collapsed position, the legs 309 form a cylindrical exterior surface which approximates the exterior surface of the upper collar portion 305.

Optional metal prongs 312 on the interior surface of legs 309 exert a spring force biasing legs 309 outward from the lower collar portion 307 into the deployed position. Struts 310 control the outward extension of legs 309. Struts 310 are pivotally connected to the lower portion of the central section of the collapsible structure 101, for example to battery compartment 303, and pivotally connected to the interior portion of legs 309. Struts 310 act to control the legs 309 as they deploy away from the outer surface of the lower collar portion 307, limit the distance the legs 309 deploy and provide stability when the legs 309 are fully deployed. Those of ordinary skill will recognize that struts 310 could be connected at different locations on the interior surface of the legs 309 and on the central section of the collapsible structure 101 to achieve different relationships between the legs 309 and the central section of the collapsible structure 101 as desired. For example, the struts 310 could be positioned and sized such that the base 313 touches the ground or other surface beneath the base 313 when the collapsible structure 101 is deployed. Alternatively, struts 310 could be positioned and sized to insure that the base 313 does not touch the ground or other surface beneath the base when the collapsible structure 101 according to the invention is deployed.

Figure 4:
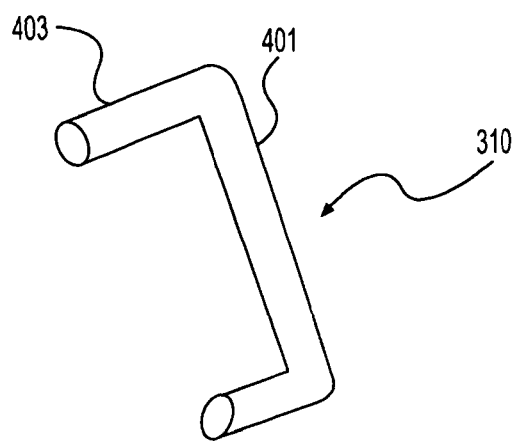
FIG. 4 shows a strut in an assembly for use in a collapsible structure according to the invention.

FIG. 4 illustrates one possible configuration of strut 310. The strut 310 has a central member 401 extending between a first strut leg 403 which pivotally engages a leg 309 and a second strut leg which pivotally engages the battery compartment 303. Other strut configuration may be used without departing from the scope of the invention.

When the legs 309 are collapsed, the exterior surface of each leg 309 is substantially aligned with the exterior surface of lower collar portion 307, thereby forming a substantially cylindrical shape covering the main body 301 and battery compartment 303. Base 313 encloses battery compartment 303 forming a battery compartment lid at its bottom portion. As shown in FIG. 3, base 303 has an outer diameter which approximates the outer diameter of the upper collar portion 305. In one exemplary configuration, a lip 315 formed by the exterior of the battery compartment 303 and base 313 can be entirely recessed or recessed in one or more locations so that 7 when legs 309 are collapsed, they can be held in place by the recesses. As noted above, however, an alternative is to hold legs 309 closed with a strap 105.

In operation, collar 109 and main body 301 move relative to each other, so that the collapsible structure 101 can be deployed or placed in the collapsed position. Collar 109 has hand grips 320, which are openings in the upper collar portion 305. These openings serve as hand grips for use in collapsing the collapsible structure 101. When the collapsible structure 101 is deployed and the collar 109 is lifted using hand grips 320, legs 309 lift from the surface on which they sit and move toward the battery compartment 303. This movement of the legs 309 toward the battery compartment 303 drives the collar 109 upward relative to the main body 301. When the collapsible structure 101 is deployed from the closed position, collar 109 moves downward relative to the main body 301, as the legs 309 move away from the battery compartment 303.

In order to facilitate and control the movement between the main body 301 and the collar 109, main body 301 has slots 317 on its exterior surface 319. Slots 317 can be formed either as indentations in the exterior surface 319 of the main body 301 or parallel protrusions from the exterior surface 319.

Figure 5:
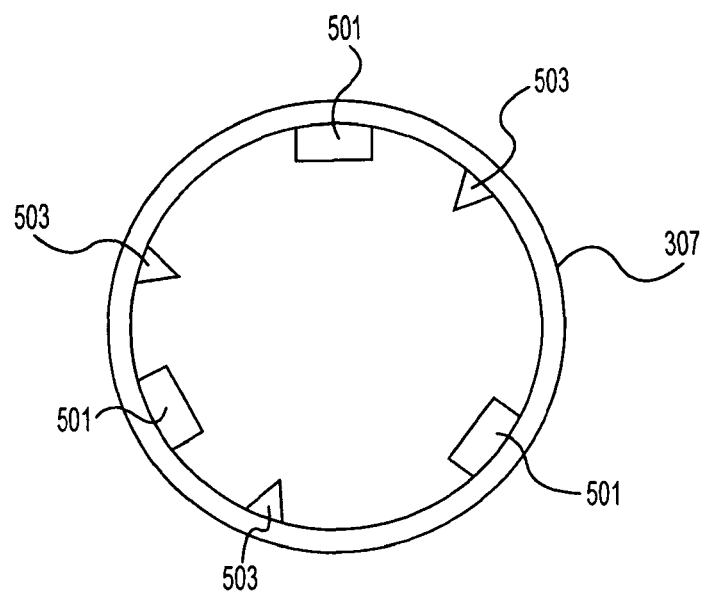
FIG. 5 shows a portion of a collar assembly in a collapsible structure according to the invention.

As shown in FIG. 5, at least one part of collar 109, such as lower collar portion 307, has on its interior one or more guides 501. Guides 501 engage slots 317 in main body 301 and slide therein. FIG. 5 also shows lower collar portion 307 having one or more other interior members 503 on its inner surface. Interior members 503 provide added strength to the collar portion. In addition, because interior members 503 extend inward toward the main body 301, interior members 503 help to control lateral movement or wobbling between the main body 301 and the collar 109.

Figure 6:
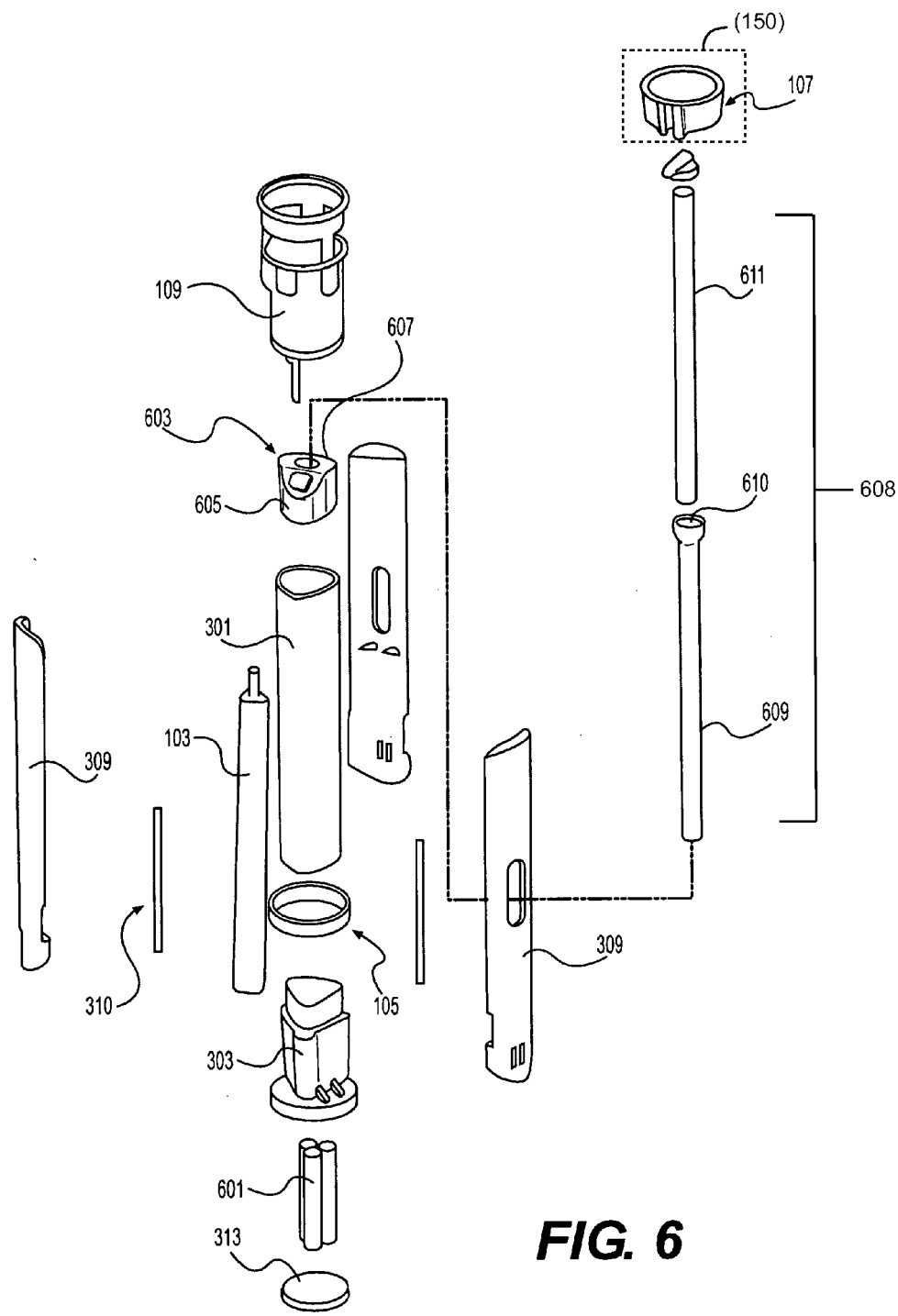
FIG. 6 shows an exploded view of the elements of a collapsible structure according to the invention.

FIG. 6 is an exploded view of the elements of the exemplary embodiment of the collapsible structure 101 according to the invention as discussed herein. FIG. 6 illustrates how the various elements previously discussed fit together. In addition, FIG. 6 illustrates a battery pack 601 for insertion into battery compartment 303. FIG. 6 also shows top cap 603 which mounts into the upper portion of main housing 301. Top cap 603 includes power switch 605. Power switch 605 can be a on-off switch or can be configured to cause operational unit 150, such as lamp head 107 to emit multiple levels of illumination, for example, dim, medium and bright. Switch 605 can also be configured to turn on illuminating elements in the lamp head 107 in a desired sequence. Switch 605 can also be continuously variable, so that the lamp head 107 can be dimmed. The switch 605 can be any type suitable for turning on operational unit 150, for example a rotary switch, without departing form the scope of the invention.

Preferably, top cap 603 and base 313 along with main body 301 and battery compartment 303 form a watertight enclosure, which protects elements within the main body 301, particularly during transport. The elements within this watertight enclosure include the battery pack 601, electrical circuits and switches, cables supplying electrical power to the operational unit 150, and telescoping member 608, which adjusts the height of the operational unit 150. Such a watertight enclosure also helps facilitate flotation of the collapsible structure 101 according to the invention, should it fall into a liquid.

Top cap 603 has opening 607 which accommodates one or more telescoping tubes. FIG. 6 shows a telescoping member 608 that includes fixed tube 609 with cam lock 610 and a telescoping tube 611 which fits within fixed tube 609. The cam lock 610 can be used to set the height of telescoping tube 611 to any desired position within the range of the length of the tubes. More than one telescoping tube and cam lock can be used without departing from the scope and spirit of the invention. Electrical power to the operational unit 150 is typically delivered through a coiled cable (not shown) which fits within the tubes and extends to a length appropriate to size and number of telescoping tubes.

Figure 7:
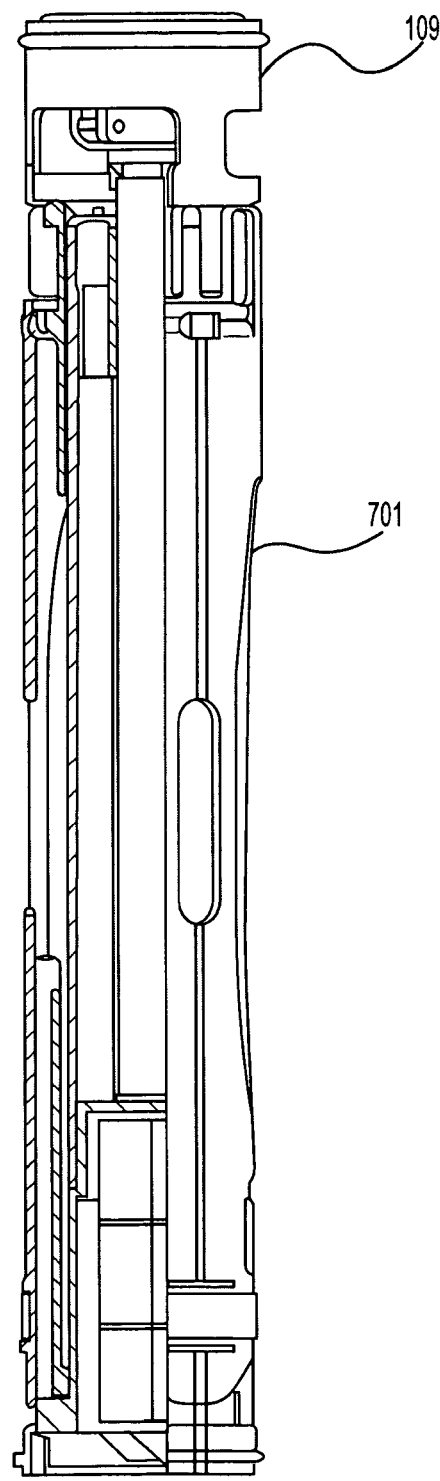
FIG. 7 shows a transparent view of a collapsible structure according to the invention in the collapsed position to illustrate its internal configuration.

FIG. 7 is a transparent view of the collapsible structure 101 according to the invention, which illustrates the components of the collapsible structure 101 in the collapsed position for transport. FIG. 7 also illustrates an optional protective feature which can be provided by collar 109. As shown in FIG. 7, collar 109 and operational unit 150, such as lamp head 107, are sized such that when the collapsible structure 101 is collapsed and the telescoping tubes 611 of the telescoping member 608 are retracted into each other, operational unit 150 fits within collar 109. Thus, when sized this way collar 109 protects operational unit 150 from damage during transport. As noted, however, this feature is optional and operational unit 150 can be of any desired size. FIG. 7 illustrates still another feature of the collapsible structure 101 according to the invention. As shown in FIG. 7, the collapsible structure 101 according to the invention can be scalloped in at least one area 701 to facilitate carrying the unit on one's back, for example using should strap 103 as previously disclosed herein.

Figure 8:
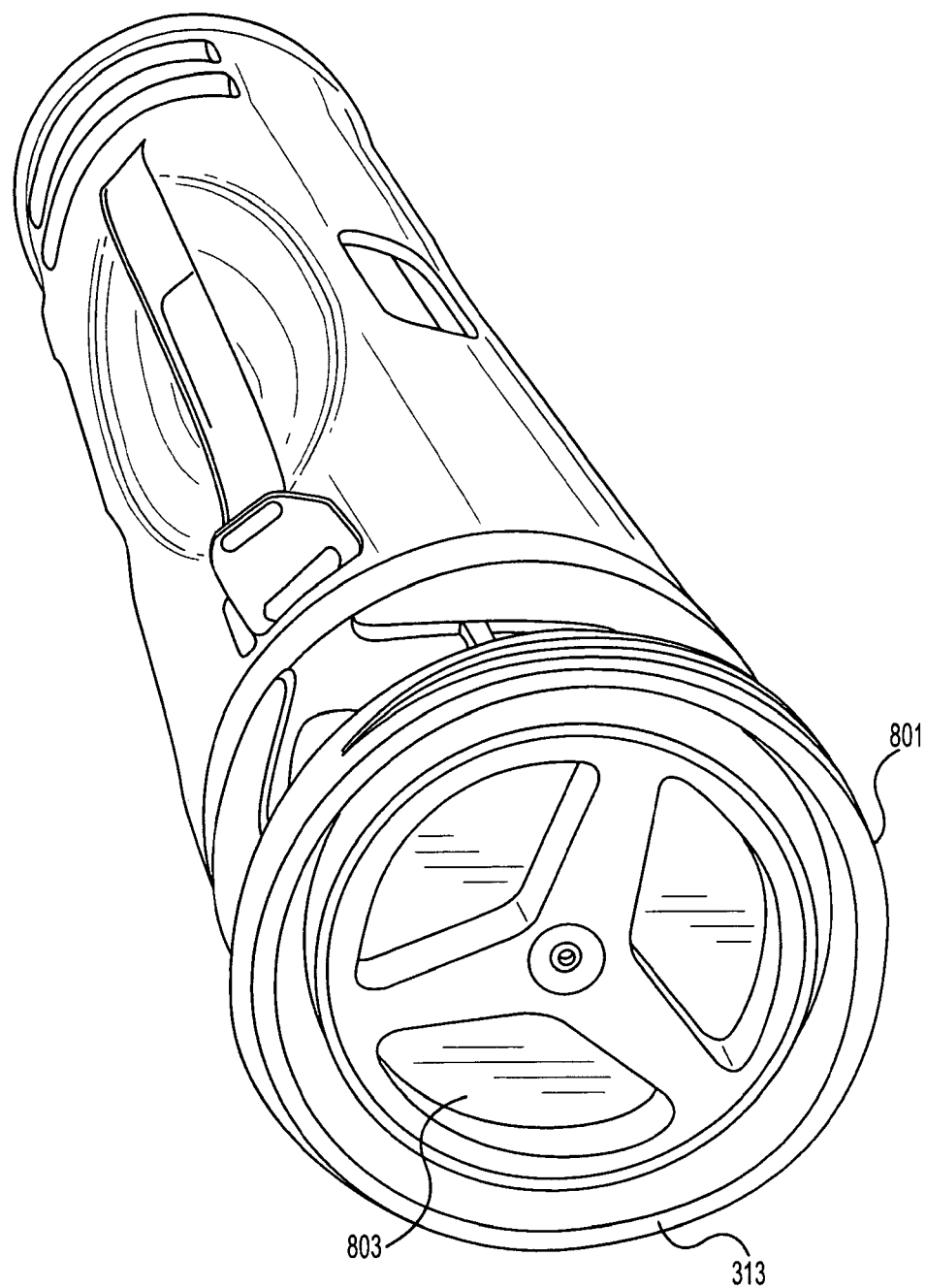
FIG. 8 shows a bottom perspective view of a collapsible structure according to the invention in a collapsed position.

FIG. 8 illustrates a perspective view of the collapsible structure 101 according to the invention in a closed position. FIG. 8 illustrates base 313, which forms a battery compartment lid, with a rim 801 to protect the battery compartment 303. The battery compartment lid provides access to change the batteries, which power the operational unit 150. Connections between the battery and the cable to the operational unit 150 are internal to the battery compartment. The battery compartment 303 can also have a charging socket 803, as shown in FIG. 8. Charging circuitry is internal to the battery compartment 303 and is not shown.

Figure 9:
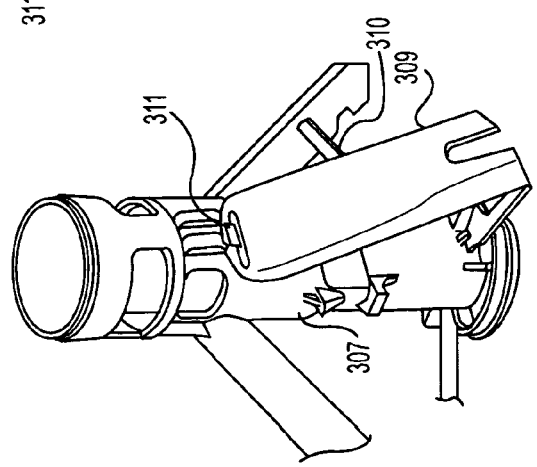
FIG. 9 shows the collar, base and legs of an assembly according to the invention.

FIG. 9 is a more detailed illustration of the pivot connection between lower collar portion 307 and legs 309. As noted previously, a metal prong can be used to bias the legs 309 outward toward the deployed position. FIG. 9 shows another arrangement in which latch 901 is used to lock legs 309 into the deployed position.

Figure 10:
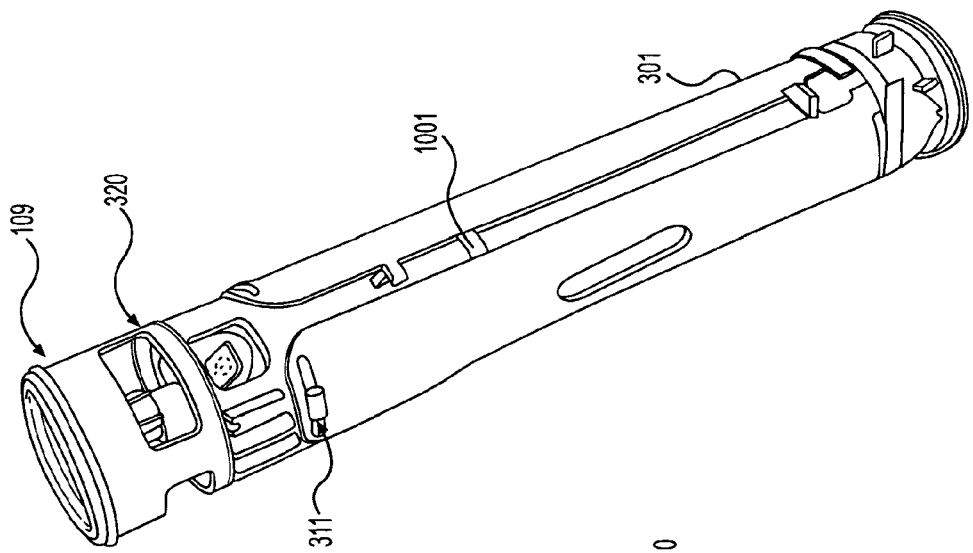
FIG. 10 is a side view of a collapsible structure according to the invention in a collapsed position.

The side view in FIG. 10 illustrates another approach to locking in the closed position. In FIG. 10 latch 1001 is used to latch the collar 109 to the legs 309 to maintain the collapsed position. FIG. 10 also illustrates the cylindrical shape, resembling that of a bazooka, of the collapsible structure 101 according to the invention when in the collapsed position.

Figure 11:
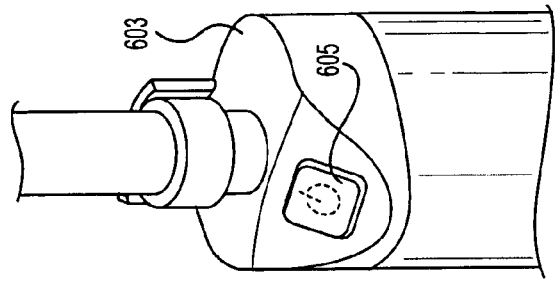
FIG. 11 illustrates the position of a multifunction power switch in a collapsible structure according to the invention.

FIG. 11 is a more detailed illustration of switch 605 as located in main body top cap 603. Switch 605 can be equipped with a backlight, such as an LED, or other indicator to provide an indication of the current charge level.

Figure 12:
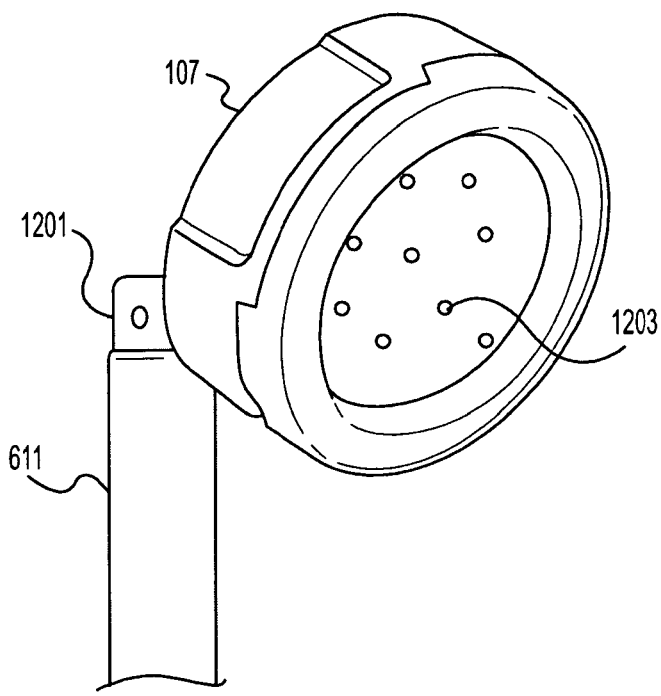
FIG. 12 illustrates an operational unit in a collapsible structure according to the invention from a front perspective position.

FIG. 12 shows the lamp head 107 from the front, or illuminating side, as connected to an end of the telescoping tube 611. As illustrated in FIG. 12, lamp head 107 is connected to the telescoping tube 611 using a connector 1201 which can pivot and/or rotate within the telescoping tube 611 to provide a wide range of motion. FIG. 12 also shows light emitting diodes 1203 in the lamp head 107, which illuminate to provide light. One or more other types of illuminating members could also be used. For example, the light emitting diodes could be replaced with or used in conjunction with halogen bulb, fluorescent bulb and/or incandescent bulbs. Any desired combination of such illuminating elements could be controlled by switch 605 to illuminate in any desired sequence, without departing from the scope of the invention.

Figure 13:
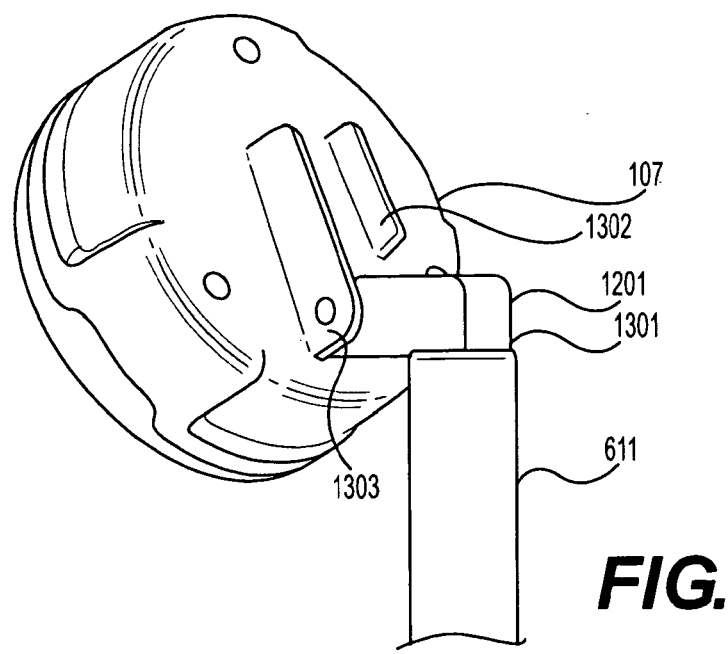
FIG. 13 illustrates an operational unit in a collapsible structure according to the invention from a rear perspective position.

FIG. 13 shows lamp head 107 connected to telescoping tube 611 from the rear of the lamp head 107. As shown in FIG. 13, when pivoting connector 1201 is an offset hinge. Offset hinge 1202 includes a member 1301, which connects at a first end to the telescoping tube 611. Member 1301 can be arranged to rotate within tube 611, thereby allowing lamp head 107 to be placed anywhere in a 360 range to direct light as desired. A second end of member 1301 pivotally connects to member 1302, which is connected to lamp head 107. By pivoting second member 1302 about point 1303, light from lamp head 107 can be directed vertically as desired. As shown, offset hinge 1201 permits about 135 degrees of movement of lamp head 107. Other arrangements which permit a wider or smaller range of motion may also be used. When the collapsible structure 101 according to the invention is to be placed in the collapsed position, lamp head 107 is pulled toward the telescoping tube 611, such that member 1302 pivots about point 1303 to collapse member 1302 toward member 1301. When member 1302 is collapsed on member 1301, lamp head 107 is positioned so that the illuminating elements therein face upward vertically. In this way, when the telescoping tube 611 is lowered into the main body 301, the lamp head 107 can be recessed into collar 109, so that collar 109 protects the lamp head 107. As illustrated in FIG. 12, when deployed, the connection between the lamp head 107 and the main body 301 provides a wide range of motion, allowing the lamp head 107 to be rotated to direct the light in a preferred direction and to be pointed upward or downward at an angle limited only by the physical dimensions of the lamp head 107 and the pivoting connector 1201. It will also be recognized that more than one pivoting connector 1201 can be used to direct light in any desired direction.

Figure 14:
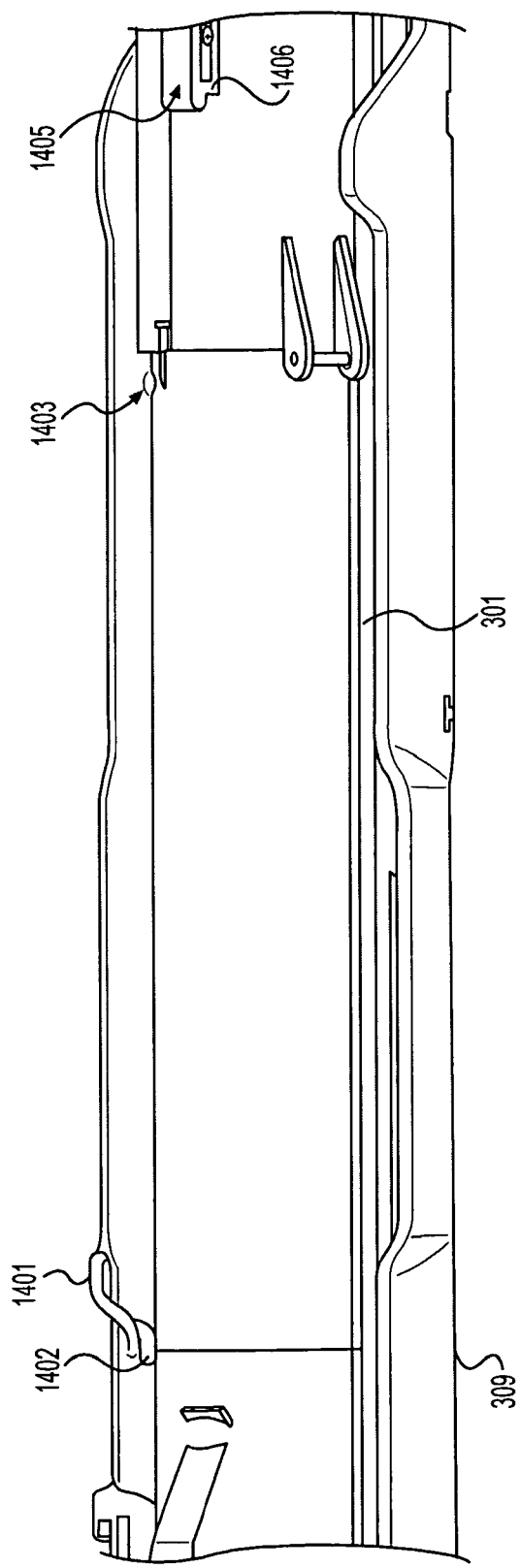
FIG. 14 illustrates a latching mechanism for use in a collapsible structure according to the invention.

FIG. 14 shows a detail of a latch mechanism that can be used in a collapsible structure according to the invention. FIG. 14 shows main body 301 and leg 309 in the collapsed position. To deploy, one lifts the flexible latch 1401 located on battery compartment 303. Leg 309 deploys outward from the main body 301 until member 1402 aligns with groove 1403. Lifting latch 1401 to disengage member 1402 from groove 1403 allows the collapsible structure 101 to return to the collapsed position. In this position, hoop 1405 on the inside of the leg 309 engages with a corresponding fork 1406, thereby eliminating the need for a leg strap to hold the legs 309 in collapsed position.

Figure 15:
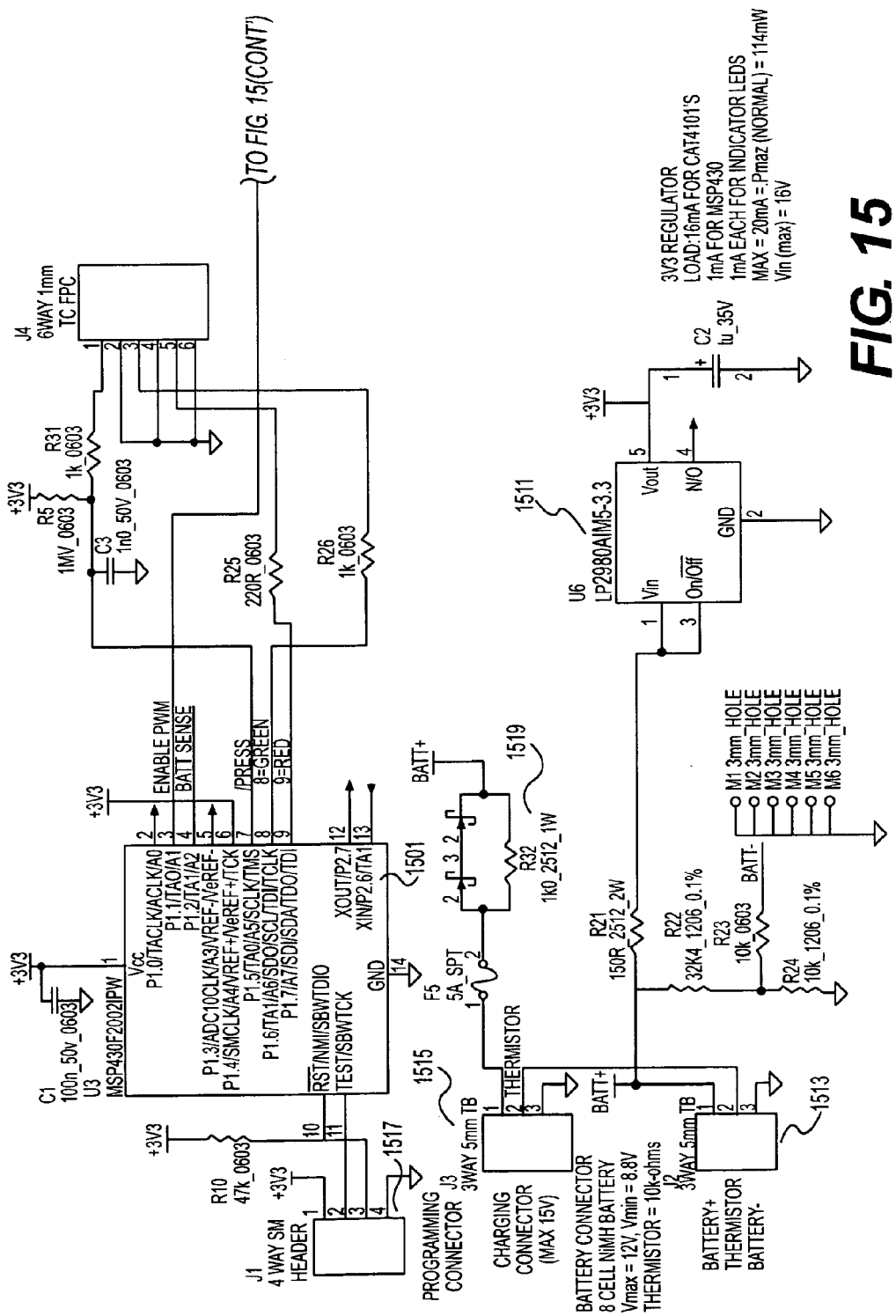
FIG. 15 is an electrical schematic of a collapsible structure according to the invention.

FIG. 15 is an electrical schematic of the collapsible structure 101 according to the invention. Those of ordinary skill will recognize that the circuits implement the features previously discussed herein. Microcontroller 1501, such as MSP430F2002IPW, provides general control and operation to control LED drivers 1503, 1505, 1507, and 1509, for example, CAT 4101. These regulate the current to (drive) LEDs 1510 and 1512, 1514, and 1516. LEDS 1510, 1512, 1514, and 1516 receive power from fuse/resistor circuits 1502, 1504, 1506, and 1508. Voltage regulator 1511 provides voltage regulation from battery 1513. Battery 1513 may be recharged through charging connector 1515 and charging circuit 1519. Microcontroller 1501 is programmed to perform its functions through programming connector 1517.

The above description for a collapsible structure, such as a portable light, is illustrative, as the structure of the invention may be used in conjunction with other devices. It will be recognized that the lamp head 107 may be replaced by other operational units 150 performing other functions. For example, the lamp head 107 may be replaced by a speaker to broadcast sound, a device which provides heat, a fan, a sensor to measure contaminants or air quality or any other number of devices. Indeed, the operational unit 150 connected to the telescoping member 608 need not be powered. For example, the operational unit 150 in the description above may be replaced by a reflector or a solar powered device, which generates its own power. In the case of an operational unit 150, which does not require power, the battery compartment 303 can remain empty. In still another application, the operational unit 150 connected to the end of the telescoping member 608 may be one which generates electrical power, such as a windmill or solar collector. In that case, the battery compartment 303 discussed above may be used to house energy storage devices.

What is claimed is:

1. A collapsible structure having a fully deployed position and a fully collapsed position, the collapsible structure comprising:

a main body having a longitudinal axis;

a cap at an end of the main body, the cap having an opening;

a telescoping member extending through the opening of the cap to move relative to the cap along the longitudinal axis of the main body, the telescoping member being adjustable relative to said main body; and an operational unit positioned at a first end of said telescoping member;

wherein the main body includes a base on one end, the cap is mounted to another end of the main body, and the main body, base and cap form a watertight enclosure when the telescoping member extends through the opening in the cap;

a collar surrounding said main body, said collar configured for movement along said longitudinal axis of said main body at least between a first collar position relative to said main body when said collapsible structure is in a deployed position and a second collar position relative to said main body when said collapsible structure is in a collapsed position;

a plurality of legs adjustably connected to said collar, said legs configured to support said operational unit in an upright position when said collapsible structure is in said deployed position, a position of said legs corresponding to a position of said collar.

2. The collapsible structure recited in claim 1, wherein the cap is mounted to an end of the main body in a watertight manner.

3. A collapsible structure comprising:
a main body;
a cap mounted to the main body, the cap having an opening;
a telescoping member extending through the opening of the cap to move relative to the cap in a longitudinal direction of the main body, the telescoping member being adjustable to a position within said main body;
an operational unit positioned at a first end of said telescoping member; and
a collar surrounding said main body, said collar configured for movement at least between a first collar position relative to said main body when said collapsible structure is in a deployed position and a second collar position relative to said main body when said collapsible structure is in a collapsed position;
wherein said collar encloses exterior side surfaces of said operational unit when said collapsible structure is in said collapsed position; and
wherein the operational unit is positioned fully within the collar when said collapsible structure is in said collapsed position and is positioned fully outside of the collar when said collapsible structure is in said deployed position.

4. A collapsible structure comprising:
a main body;
a cap mounted to an end of the main body, the cap having an opening;
a telescoping member extending through the opening of the cap to move relative to the cap in a longitudinal direction of the main body, the telescoping member being adjustable relative to said main body;
an operational unit;
an electrical connection to provide a connection between a power source and said operational unit;
a collar surrounding said main body, said collar configured for movement at least between a first collar position relative to said main body when said collapsible structure is in a deployed position and a second collar position relative to said main body when said collapsible structure is in a collapsed position; and
a plurality of legs adjustably connected to said collar such that a position of said legs corresponds to a position of said collar, said legs configured to support said operational unit in an upright position when said collapsible structure is in said deployed position;
wherein said collar encloses exterior side surfaces of said operational unit when said collapsible structure is in said collapsed position; and
wherein the main body includes a base on one end, the cap is mounted to another end of the main body, and the main body, base and cap form a watertight enclosure when the telescoping member extends through the opening in the cap.

5. The collapsible structure of claim 4, wherein said operational unit comprises an emitting device that comprises a speaker for emitting sound.

6. The collapsible structure of claim 4, wherein said operational unit comprises an emitting device that comprises a heating device for emitting heat.

7. The collapsible structure of claim 4, wherein said collar is sized and configured to receive at least a portion of said operational unit.

8. The collapsible structure recited in claim 4, wherein the cap is mounted to an end of the main body in a watertight manner.

9. A collapsible structure comprising:
a main body;
a cap mounted to the main body, the cap having an opening;
a telescoping member extending through the opening of the cap to move relative to the cap in a longitudinal direction of the main body, the telescoping member being adjustable to a position within said main body;
an operational unit positioned at a first end of said telescoping member; and
a collar surrounding said main body, said collar configured for movement at least between a first collar position relative to said main body when said collapsible structure is in a deployed position and a second collar position relative to said main body when said collapsible structure is in a collapsed position;
wherein said collar encloses exterior side surfaces of said operational unit when said collapsible structure is in said collapsed position; and
wherein the main body includes a base on one end, the cap is mounted to another end of the main body, and the main body, base and cap form a watertight enclosure when the telescoping member extends through the opening in the cap.

10. The collapsible structure recited in claim 9, further comprising:
a leg pivotally connected to said collar to support said collapsible device in said deployed position.

11. The collapsible structure recited in claim 10, wherein said collar adjusts to said first collar position when said leg is in a first leg position to support said collapsible structure in said deployed position and said collar adjusts to said collar second position when said leg is in a second leg position.

12. The collapsible structure of claim 10, wherein said leg is configured to be biased outward from said collar.

13. The collapsible structure recited in claim 9, comprising a pivoting connector between said operational unit and said telescoping member.

14. The collapsible structure recited in claim 13, wherein said pivoting connection between said operational unit and said telescoping member comprises a hinge joint.

15. The collapsible structure of claim 9, wherein said operational unit comprises a sensor for sensing a parameter.

16. The collapsible structure of claim 9, wherein said operational unit comprises a reflector for reflecting light.

17. The collapsible structure of claim 9, wherein said operational unit comprises an energy-generating device.

18. The collapsible structure of claim 9, wherein said operational unit comprises a cooling device.

19. The collapsible structure of claim 9, wherein said collar is sized and configured to receive at least a portion of said operational unit.

20. The collapsible structure of claim 9, wherein said operational unit is operated by a power source.

21. The collapsible structure of claim 9,
said collar comprising an upper collar portion having an outer diameter and a lower collar portion having an outer diameter;
wherein said outer diameter of said upper collar portion is wider than said outer diameter of said lower collar portion.

22. The collapsible structure of claim 9, wherein said collar is configured for movement along a longitudinal axis of said main body at least between a first collar position relative to said main body when said collapsible structure is in a deployed position and a second collar position relative to said main body when said collapsible structure is in a collapsed position.

23. The collapsible structure of claim 22, wherein said first collar position is spaced from said second collar position along said longitudinal axis of said main body.

24. The collapsible structure recited in claim 9, wherein the cap is mounted to an end of the main body in a watertight manner.

25. The collapsible structure recited in claim 9, wherein the operational unit comprises a light head that supports at least one light emitting device, the light emitting device being positioned within the collar when said collapsible structure is in said collapsed position and being positioned outside of the collar when said collapsible structure is in said deployed position.

* * * * *